United States Patent
Chauvel et al.

(10) Patent No.: US 7,533,250 B2
(45) Date of Patent: May 12, 2009

(54) AUTOMATIC OPERAND LOAD, MODIFY AND STORE

(75) Inventors: Gerard Chauvel, Antibes (FR); Jean-Philippe Lesot, Etrelles (FR); Gilbert Cabillic, Brece (FR)

(73) Assignee: Texas Instruments Incorporated, Dallas, TX (US)

( * ) Notice: Subject to any disclaimer, the term of this patent is extended or adjusted under 35 U.S.C. 154(b) by 442 days.

(21) Appl. No.: 11/188,311

(22) Filed: Jul. 25, 2005

(65) Prior Publication Data

US 2006/0026400 A1   Feb. 2, 2006

(30) Foreign Application Priority Data

Jul. 27, 2004 (EP) ................. 04291918

(51) Int. Cl.
*G06F 9/30* (2006.01)
*G06F 9/40* (2006.01)
*G06F 15/00* (2006.01)
*G06F 7/38* (2006.01)
*G06F 9/00* (2006.01)
*G06F 9/44* (2006.01)

(52) U.S. Cl. ............ 712/226; 712/208; 712/209; 712/211

(58) Field of Classification Search ........... 712/226
See application file for complete search history.

(56) References Cited

U.S. PATENT DOCUMENTS

| | | | |
|---|---|---|---|
| 4,312,034 A | 1/1982 | Gunter et al. | |
| 5,119,484 A * | 6/1992 | Fox | 712/226 |
| 5,390,311 A | 2/1995 | Fu et al. | |
| 5,796,972 A | 8/1998 | Johnson et al. | |
| 5,983,337 A | 11/1999 | Mahalingaiah et al. | |
| 6,021,469 A * | 2/2000 | Tremblay et al. | 711/125 |
| 6,026,485 A * | 2/2000 | O'Connor et al. | 712/226 |
| 6,298,434 B1 * | 10/2001 | Lindwer | 712/209 |
| 6,385,764 B1 * | 5/2002 | Blandy et al. | 717/127 |
| 6,412,108 B1 * | 6/2002 | Blandy et al. | 717/152 |
| 6,684,323 B2 * | 1/2004 | Soni | 712/226 |
| 6,789,172 B2 | 9/2004 | Chauvel et al. | |
| 6,792,508 B1 | 9/2004 | Chauvel et al. | |
| 6,826,652 B1 | 11/2004 | Chauvel et al. | |
| 6,912,649 B2 * | 6/2005 | Luick | 712/220 |
| 6,965,984 B2 | 11/2005 | Seal et al. | |
| 7,194,606 B2 * | 3/2007 | Bhushan et al. | 712/226 |
| 2003/0196076 A1 * | 10/2003 | Zabarski et al. | 712/234 |

* cited by examiner

*Primary Examiner*—Eric Coleman
*Assistant Examiner*—Corey S Faherty
(74) *Attorney, Agent, or Firm*—Ronald O. Neerings; Wade James Brady, III; Frederick J. Telecky, Jr.

(57) ABSTRACT

A processor comprising a decode logic coupled to a first storage unit and comprising a data structure. The processor also comprises a second storage unit coupled to the decode logic. The decode logic obtains a single instruction from the first storage unit and, if indicated by a first bit in the data structure, processes a group of instructions in lieu of the single instruction, where the single instruction requires an operand. If indicated by a second bit in the data structure, the decode logic obtains the operand from the first storage unit, modifies the operand, and stores the operand to the second storage unit for use by the group of instructions.

19 Claims, 4 Drawing Sheets

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

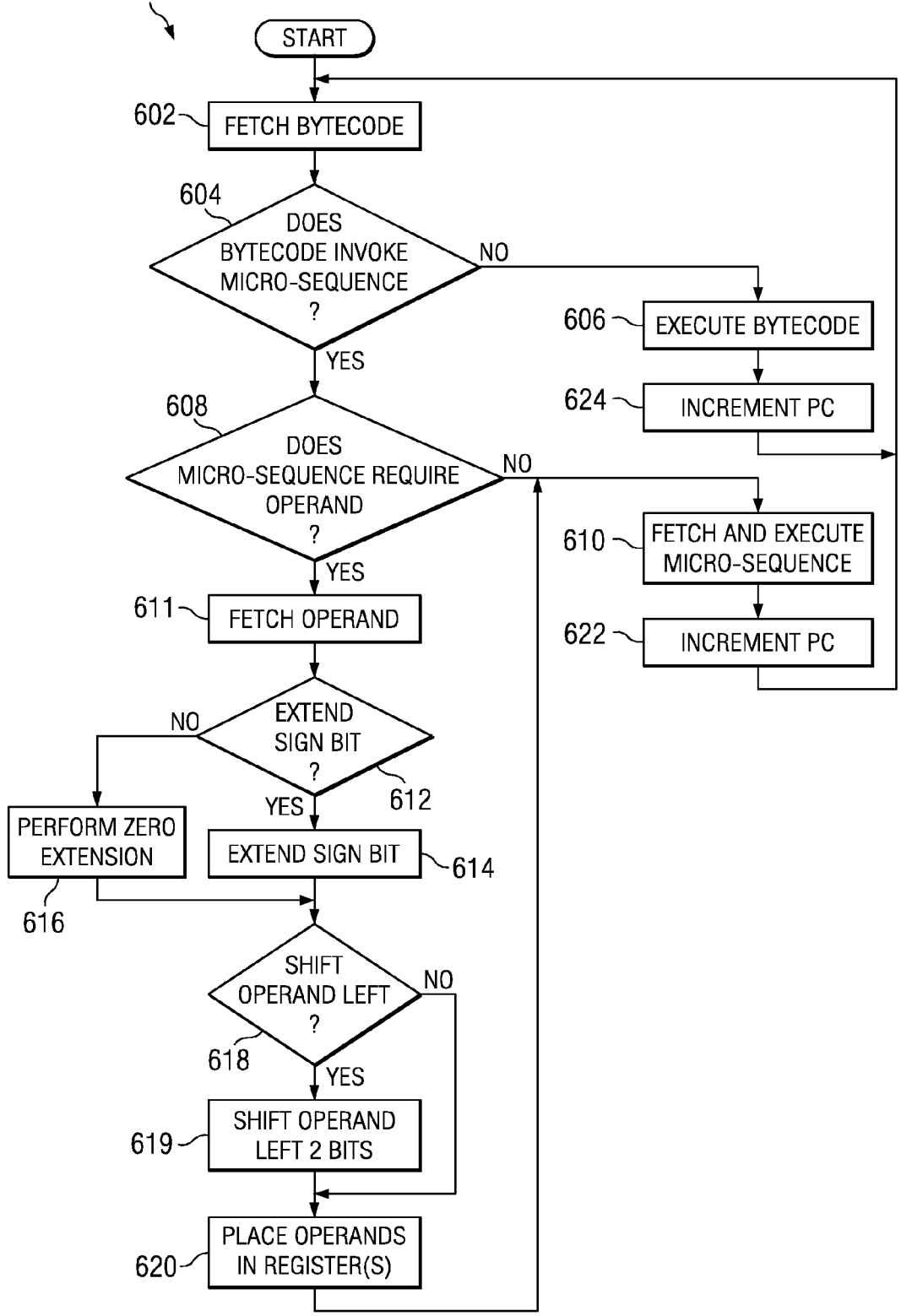

AUTOMATIC OPERAND LOAD, MODIFY AND STORE

CROSS-REFERENCE TO RELATED APPLICATIONS

This application claims priority to European Patent Application No. 04291918.3, filed on Jul. 27, 2004 and incorporated herein by reference. This application is related to co-pending and commonly assigned application Ser. No. 11/188,827, entitled, "Automatic Operand Load And Store," which is incorporated by reference herein.

BACKGROUND

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and is as efficient as possible. Improvements in this area are desirable.

BRIEF SUMMARY

Disclosed herein is a technique for automatically loading and storing operands such that the efficiency of the electronic device is improved. An illustrative embodiment of the invention may comprise a processor comprising a decode logic coupled to a first storage unit and comprising a data structure. The processor also comprises a second storage unit coupled to the decode logic. The decode logic obtains a single instruction from the first storage unit and, if indicated by a first bit in the data structure, processes a group of instructions in lieu of the single instruction, where the single instruction requires an operand. If indicated by a second bit in the data structure, the decode logic obtains the operand from the first storage unit, modifies the operand, and stores the operand to the second storage unit for use by the group of instructions.

Another illustrative embodiment may comprise an electronic device comprising a decode logic and a data structure comprising a plurality of entries. At least one entry has a corresponding instruction that comprises a first field indicating whether the corresponding instruction is to be replaced by a group of instructions, where the corresponding instruction requires an operand. The entry further comprises a second field indicating how the decode logic is to modify the operand.

Yet another illustrative embodiment may comprise a method that comprises fetching a single instruction using a decode logic that comprises a data structure and is coupled to a first storage unit and a second storage unit, the single instruction requiring an operand. The method also comprises, if indicated by a first field in the data structure, processing a group of instructions in lieu of the single instruction. The method further comprises obtaining the operand from the first storage unit using the decode logic. The method further still comprises modifying the operand as indicated by a second field in the data structure and storing the operand in the second storage unit for use by the group of instructions.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 6 shows a flow chart describing a method with which the technique described herein may be implemented, in accordance with embodiments of the invention.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein is particularly suited for executing Java™ Bytecodes or comparable code. As is well known, Java is particularly suited for embedded applications. Java is a stack-based language, meaning that a processor stack is heavily used when executing various instructions (e.g., Bytecodes), which instructions generally have a size of 8 bits. Java is a relatively "dense" language meaning that on average each instruction may perform a large number of functions compared to various other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 1:
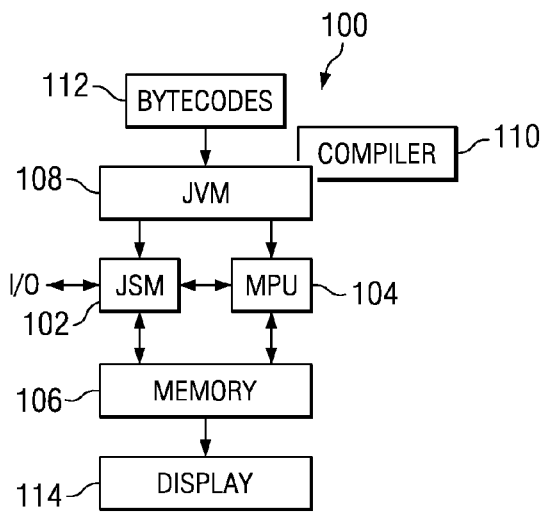
FIG. 1 shows a diagram of a system in accordance with preferred embodiments of the invention and including a Java Stack Machine ("JSM") and a Main Processor Unit ("MPU"), in accordance with embodiments of the invention.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two types of instruction sets. One type of instruction set may comprise standard Java Bytecodes. As is well-known, Java is a stack-based programming language in which instructions generally target a stack. For example, an integer add ("IADD") Java instruction pops two integers off the top of the stack, adds them together, and pushes the sum back on the stack. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, the execution of one or more of the complex Bytecodes may be replaced by the execution of a "micro-sequence" comprising various other instructions.

Another type of instruction set executed by the JSM 102 may include instructions other than standard Java instructions. In accordance with at least some embodiments of the invention, the other instruction set may include register-based and memory-based operations to be performed. This other type of instruction set generally complements the Java instruction set and, accordingly, may be referred to as a complementary instruction set architecture ("C-ISA"). By complementary, it is meant that the execution of a complex Java Bytecode may be replaced by the execution of a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA. Because various of the data structures described herein are generally JVM-dependent and thus may change from one JVM implementation to another, the software flexibility of the micro-sequence provides a mechanism for various JVM optimizations now known or later developed.

Figure 2:
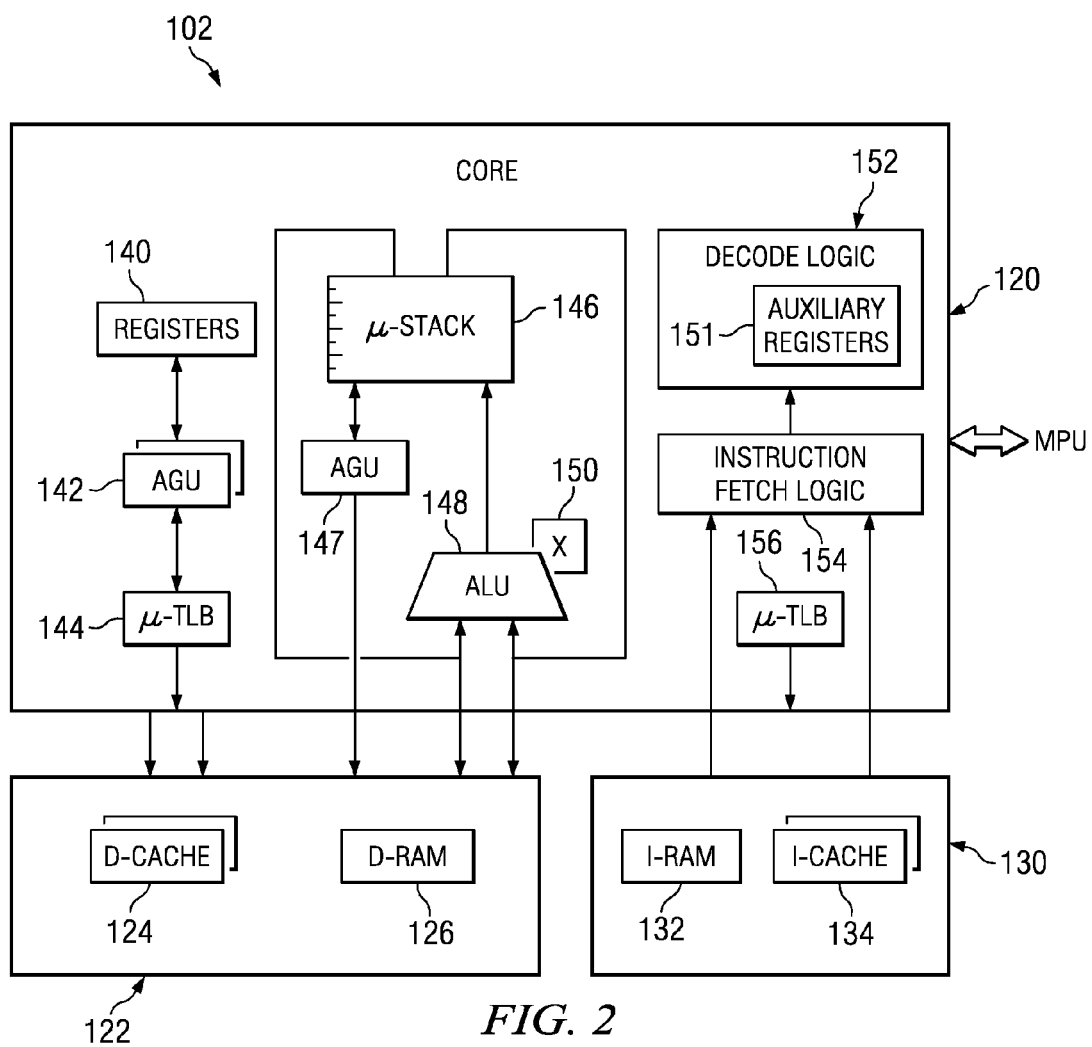
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. Immediate operands may be fetched from the instruction storage 130, since immediate operands generally are grouped with corresponding instructions in the instruction code. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151.

Figures 3, 4:
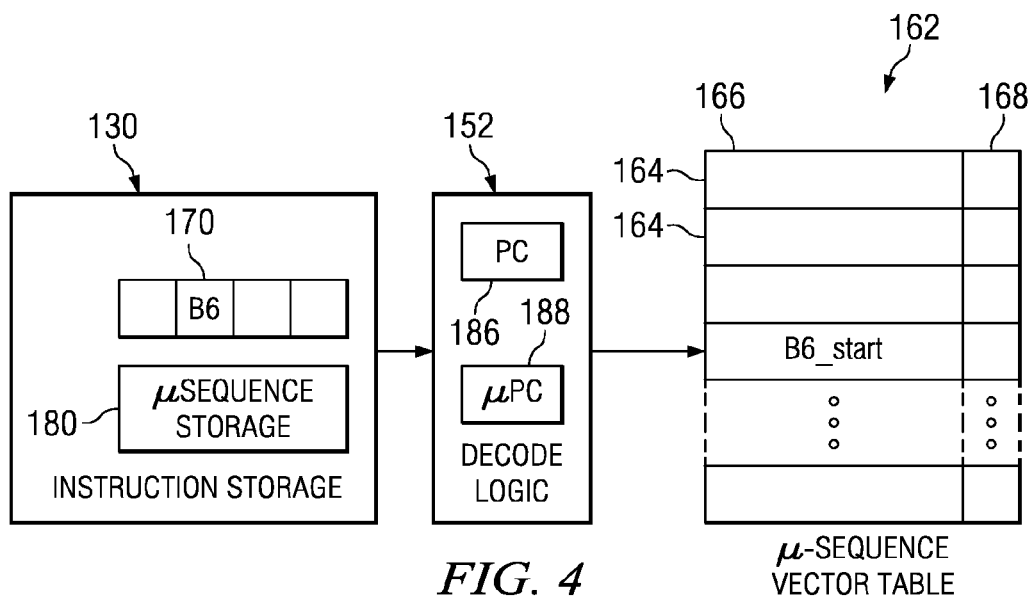
FIG. 3 shows various registers used in the JSM of FIGS. 1 and 2, in accordance with embodiments of the invention.
FIG. 4 shows the operation of the JSM to execute "micro-sequences," in accordance with embodiments of the invention.

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7. The top of the micro-stack 146 has a matching address in external memory pointed to by register R6. The values contained in the micro-stack 146 are the latest updated values, while their corresponding values in external memory may or may not be up to date. Register R7 provides the data value stored at the top of the micro-stack 146. Register R15 may be used for status and control of the JSM 102. At least one bit (called the "Micro-Sequence-Active" bit) in status register R15 is used to indicate whether the JSM 102 is executing a simple instruction or a complex instruction through a micro-sequence. This bit controls, in particular, which program counter is used (PC or µPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as described below. The I-cache 134 may be used to store other types of Java Bytecode and mixed Java/C-ISA instructions.

As noted above, the C-ISA instructions generally complement the standard Java Bytecodes. For example, the compiler 110 may scan a series of Java Bytecodes 112 and replace the execution of a complex Bytecode with the execution of a micro-sequence as explained previously. The micro-sequence may be created to optimize the function(s) performed by the replaced complex Bytecodes.

FIG. 4 illustrates the operation of the JSM 102 to replace the execution of Java Bytecodes with the execution of micro-sequence instructions. FIG. 4 shows some, but not necessarily all, components of the JSM. In particular, the instruction storage 130, the decode logic 152, and a micro-sequence vector table 162 are shown. The decode logic 152 receives instructions from the instruction storage 130 and accesses the micro-sequence vector table 162. In general and as described above, the decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces the execution of a Bytecode from instructions 170 with the execution of a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. Field 168 may comprise a single bit that indicates whether the instruction 170 is to be directly executed or whether the associated field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the associated field 166 contains a reference to a micro-sequence.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the execution of the Bytecode is to be replaced by the execution of a micro-sequence. If the bit 168 indicates that the Bytecode can be directly processed and executed by the JSM, then the instruction is so executed. If, however, the bit 168 indicates that the execution of the Bytecode is to be replaced by the execution of a micro-sequence, then the decode logic 152 preferably changes this instruction into a "no operation" (NOP) and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters—the PC and the µPC. The PC and the µPC are stored in auxiliary registers 151, which in turn is stored in the decode logic 152. In accordance with a preferred embodiment, one of these two program counters is the active program counter used to fetch and decode instructions. The PC 186 may be the currently active program counter when the decode logic 152 encounters a Bytecode, the execution of which is to be replaced by the execution of a micro-sequence. Setting the status register's micro-sequence-active bit causes the micro-program counter 188 to become the active program counter instead of the program counter 186. Also, the contents of the field 166 associated with the micro-sequenced Bytecode preferably are loaded into the µPC 188. At this point, the JSM 102 is ready to begin fetching and decoding the instructions comprising the micro-sequence. At or about the time the decode logic begins using the µPC 188, the PC 186 preferably is incremented by a suitable value to point the PC 186 to the next instruction following the Bytecode whose execution is replaced by that of the micro-sequence. In at least some embodiments, the micro-sequence-active bit within the status register R15 may only be changed when the first instruction of the micro-sequence enters the execute phase of JSM 102 pipe. The switch from PC 186 to the µPC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the µPC 188 to the PC 186 upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the µPC 188 to the PC 186 is performed immediately after the instruction is decoded and the instruction after the RtuS instruction is the instruction pointed to by the address present in the PC 186.

As discussed above, the execution of one or more Bytecodes may be replaced with the execution of a micro-sequence or a group of other instructions. Such replacement instructions may comprise any suitable instructions for the particular application and situation at hand. At least some such suitable instructions are disclosed in U.S. Ser. No. 10/631,308 (Publication No. 20040024989), filed Jul. 31, 2003 and incorporated herein by reference.

Often, instructions replaced by micro-sequences require operands to perform a particular task. These instructions generally retrieve operands from one or more registers 140. However, some instructions require operands located in the I-cache 134 instead of in one of the registers 140. These operands are immediate operands. Because the micro-sequence performs the same or a similar task as the instruction(s) it replaces, if the replaced instruction(s) requires a particular operand, the micro-sequence also will require the operand which, as previously mentioned, may be stored in the I-cache 134. Access to the I-cache 134 is restricted to the fetch logic 154 because making the I-cache 134 available to additional components of the JSM 102 is associated with an increase in circuit complexity and cost. As such, a micro-sequence instruction cannot retrieve immediate operands that are located in the I-cache 134. As the micro-sequence attempts to find a required immediate operand in the registers 140, the D-cache 124 is queried for the operand. Because the D-cache 124 does not contain the operand, a cache miss occurs, and a cache line is loaded from the main memory 106 in order to obtain the necessary operand. Loading a cache line from the memory 106 is inefficient in that it consumes excessive time and power.

Figure 5A:
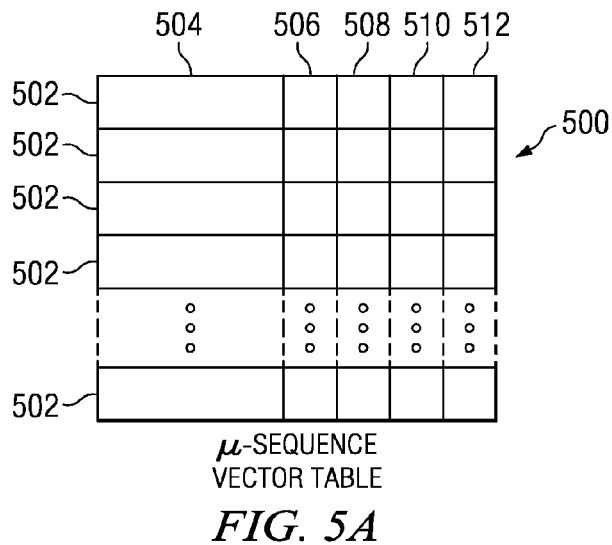
FIG. 5a shows a data structure used to load operands, in accordance with preferred embodiments of the invention.

Accordingly, in some embodiments, a modified micro-sequence vector table 500 (shown in FIG. 5a) that avoids such problems may be used instead of the micro-sequence vector table 162 previously described. The structure and usage of the vector table 500 is similar to that of the vector table 162, with the exception of three additional fields in the table 500, described further below. The vector table 500 may be implemented in the decode logic 152 or as separate logic in the JSM 102. The vector table 500 preferably includes a plurality of entries 502. The entries 502 may include one entry for each Bytecode that the JSM may receive. For example, if there are a total of 256 Bytecodes, the vector table 500 preferably comprises at least 256 entries. Each entry 502 preferably includes at least five fields—a field 504 and associated fields 506, 508, 510, 512. Field 506 may comprise a single bit that indicates whether the instruction 170 is to be directly executed or whether the associated field 504 contains a reference to a micro-sequence. For example, a bit 506 having a value of "0" may indicate the field 504 is invalid and thus, the corresponding Bytecode from instructions 170 is directly executable by the JSM. A bit 506 having a value of "1" may indicate that the associated field 504 contains a reference (e.g., an address) to a micro-sequence. The vector table 500 preferably is loaded and modified in a manner similar to that in which the vector table 162 is loaded and modified.

As mentioned above, in case the bit 506 of an entry 502 contains a "1," the execution of the corresponding Bytecode is to be replaced with the execution of an associated micro-sequence. The field 508 indicates whether this micro-sequence requires an immediate operand. More specifically, when the decode logic 152 processes a Bytecode, the decode logic 152 first refers to the entry 502 in the vector table 500 that corresponds to the Bytecode. The decode logic 152 determines the status of the bit 506 of this entry 502. If the status of the bit 506 indicates that the Bytecode has a corresponding micro-sequence, then the decode logic 152 further determines the status of the field 508 to ascertain whether the corresponding micro-sequence requires an immediate operand. If the status of the field 508 indicates that the micro-sequence requires an immediate operand, the decode logic 152 obtains the operand from the I-cache 134 via the instruction fetch logic 154 and stores the operand in one of the auxiliary registers 151 (shown in FIG. 2), preferably a dedicated auxiliary register 151. The decode logic 152 preferably stores the immediate operand in the register 151 prior to invoking the corresponding micro-sequence. In this way, when the micro-sequence is executed, the immediate operand required by the micro-sequence is available in a register 151 to be used by the micro-sequence, thereby preventing a cache miss and avoiding the time and power costs associated therewith.

The field 508 preferably comprises two bits that indicate the size of the immediate operand that is to be retrieved and stored into a register 151. If the bits in field 508 are "0 0," then no operands are to be retrieved for the corresponding micro-sequence. If the bits in field 508 are "0 1," then a single byte is to be retrieved for the corresponding micro-sequence. The single byte is fetched from the I-cache 134 by the decode logic 152 using the instruction fetch logic 154. The single byte then is stored in a dedicated auxiliary register 151 for access by the micro-sequence. Further, because a micro-sequence may not be of the same length as an instruction it replaces, the PC 186 may need to be incremented. The PC 186 preferably is incremented based on the bits in the field 508. Thus, for example, after the single byte is stored, the PC 186 is incremented by one to account for the fetched byte.

If the bits in field 508 are "1 0," then a short word (i.e., two bytes) is to be retrieved for the corresponding micro-sequence. The short word is fetched in a manner similar to the single byte, as described above. After the short word is stored to the appropriate register 151, the PC 186 preferably is incremented by two to account for the fetched short word. Similarly, if the bits in field 508 are "1 1," then a full word (i.e., four bytes) is to be retrieved for the corresponding micro-sequence. The full word is fetched in a manner similar to the single byte and the short word, as described above. After the full word is stored to the appropriate register 151, the PC 186 is incremented by four to account for the fetched full word. The scope of disclosure is not limited to assigning operand sizes to bit combinations as described above, nor is the scope of disclosure limited to using any particular number of bits in the field 508.

In some cases, an operand retrieved from the I-cache 134 may require modification before the operand is stored to one of the registers 151. For example, the register 151 to which an operand is stored preferably has a size of 32 bits, although the scope of disclosure is not limited to registers of any particular size. If the operand that is to be stored in the register 151 comprises less than 32 bits, then the operand is modified (i.e., expanded to 32 bits) so that it may be properly stored into the register 151. The operand may require modification for any of a variety of other reasons, as well. Accordingly, the fields 510, 512 comprise bits that indicate whether and in what manner the operand fetched from the I-cache 134 for a particular micro-sequence requires modification.

More specifically, field 510 comprises a bit indicating whether a sign extension or a zero extension is to be performed on a corresponding operand. For example, assuming a register 151 is a 32-bit register and an operand to be stored in the register 151 comprises one byte of data, the 32-bit register 151 is 24 bits greater in length than the operand, and so the operand may not be properly stored in the register 151. In such a case, if the field 510 is set (i.e., comprises a "1"), then the decode logic 152 performs a sign extension on the operand prior to storing the operand in the register 151. If the field 510 is not set (i.e., comprises a "0"), then the decode logic 152 performs a zero extension on the operand prior to storing the operand in the register 151. In cases where the operand has a size matching that of the register 151, it is not necessary to sign extend or zero extend the operand, and so the status of the field 510 has no effect on the operand.

Figure 5B:
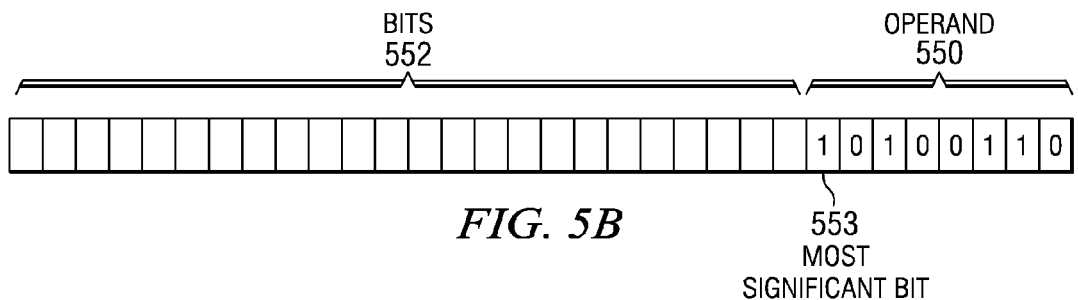
FIGS. 5b-5d show modifications of an operand, in accordance with embodiments of the invention.
Figure 5C:
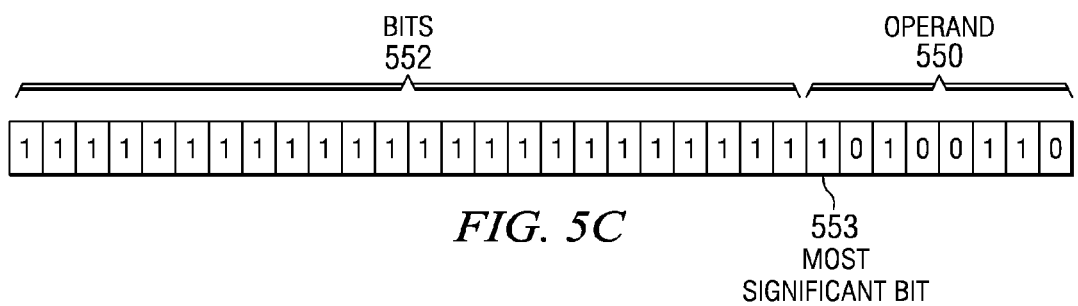
Figure 5D:
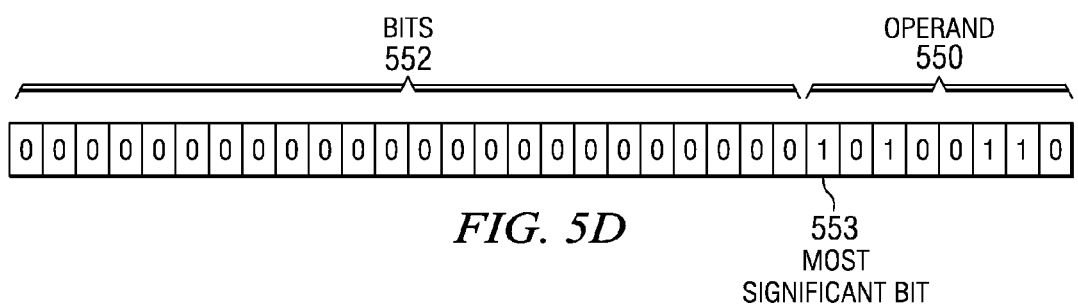

An illustrative example of a sign extension is shown in FIG. 5b. FIG. 5b shows a 1-byte operand 550 as retrieved from the I-cache 134. If the field 510 is set, the decode logic 152 performs a sign extension on the operand 550, such that the size of the operand 550 is extended from 1 byte to 32 bits. The decode logic 152 performs the sign extension by filling the 24 bits 552 with copies of the most significant bit 553 of the operand 550. In the example shown in FIG. 5b, the most significant bit 553 of the operand 550 is a "1." Thus, as shown in FIG. 5c, the bits 552 are filled with "1" bits, such that the operand 550 is sign-extended from 1 byte to 32 bits. If the most significant bit 553 of the operand 550 is a "0," then the decode logic 152 may fill the bits 552 with "0" bits. However, in case the field 510 is not set, the decode logic 152 performs a zero extension on the operand 550 as shown in FIG. 5d, wherein the size of the operand 550 is extended from 1 byte to 32 bits by filling bits 552 with "0" bits, regardless of the status of the most significant bit 553 of the operand 550.

Field 512 comprises a bit indicating whether an operand is to be shifted prior to storing the operand in a register 151. If the field 512 is set, the decode logic 152 shifts the corresponding operand to the left, preferably by two bits, although the scope of disclosure is not limited to shifting the operand in any particular manner. If the field 512 is not set, the corresponding operand is not shifted. An operand preferably is sign-extended or zero-extended prior to being shifted, although the scope of disclosure is not limited as such.

FIG. 6 shows a process 600 that may be used to implement the technique described above. The process 600 may begin by fetching a Bytecode from the instructions 170 (block 602). The process 600 then comprises determining, based on the status of the field 506, whether the Bytecode has a corresponding micro-sequence that is to be executed in lieu of the Bytecode (block 604). If the status of the field 506 indicates that there is no such micro-sequence, then the Bytecode is executed in JSM mode (block 606), the PC 186 is incremented by an amount based on the size of the operand used by the Bytecode (block 624), and the next Bytecode is accessed (block 602). However, if the status of the field 506 indicates that the execution of the Bytecode is to be replaced with the execution of a micro-sequence (block 604), then the process 600 comprises determining whether the micro-sequence requires an immediate operand (block 608).

In case the micro-sequence does not require an operand, the process 600 comprises fetching and executing the micro-sequence in C-ISA mode (block 610). The PC 186 then is incremented by one (block 622). After execution of the micro-sequence is complete and the PC 186 has been incremented, the process 600 comprises accessing the next Bytecode (block 602). However, in case the micro-sequence does require an operand (block 608), the process 600 comprises fetching the operand from the I-cache 134 using the decode logic 152 and the instruction fetch logic 154 (block 611). The process 600 then comprises determining whether a sign extension or a zero extension is to be performed on the operand (block 612). If the field 512 in the table 500 is set, the decode logic 152 performs a sign extension on the operand (block 614). If the field 512 is not set, the decode logic 152 performs a zero extension on the operand (block 616). The process 600 then comprises determining whether the operand is to be shifted (block 618). If the field 510 in the table 500 is set, the operand preferably is shifted to the left by two bits (block 619). If the field 510 is not set, the operand is not shifted. In any case, the process 600 then comprises placing the operand in a register 151 (block 620), fetching and executing the corresponding micro-sequence (block 610), incrementing the PC 186 based on the operand size indicated by the field 508 (block 622), and then processing the next Bytecode from the instructions 170 (block 602). Because the operands are loaded, modified and stored prior to execution of the micro-sequence, the modified operands are available to the micro-sequence as the micro-sequence is executed. Thus, processor efficiency is improved and power consumption is reduced in comparison to processors that do not use the techniques described herein.

Figure 7:
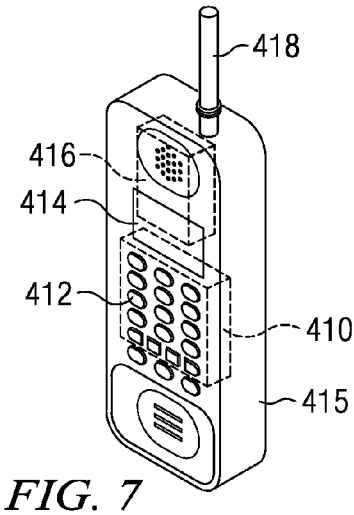
FIG. 7 shows an exemplary embodiment of the system described herein.

System 100 may be implemented as a mobile cell phone 415 such as that shown in FIG. 7. As shown, the mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   decode logic coupled to an instruction cache;
   a micro-sequence vector table coupled to the decode logic, wherein the micro-sequence vector table comprises one entry for each bytecode in an instruction set of the processor, wherein all fields in an entry are unique to a bytecode corresponding to the entry; and
   a storage unit coupled to the decode logic,
   wherein the decode logic is configured to:
      obtain a single bytecode from the instruction cache, wherein the single bytecode requires an immediate operand stored in the instruction cache,
      use the single bytecode to locate the entry corresponding to the single bytecode in the micro-sequence vector table,
      cause the processor to directly execute the single bytecode using the immediate operand when a first field in the entry indicates that the single bytecode is to be executed, and,
      when the first field in the entry indicates that a micro-sequence is to be executed instead of the single bytecode and a second field in the entry indicates that the single bytecode requires the immediate operand, obtain the immediate operand from the instruction cache, modify the immediate operand when a third field in the entry indicates that the immediate operand is to be modified, and store the modified immediate operand in the storage unit for use by the micro-sequence.

2. The processor of claim 1, wherein the decode logic is further configured to modify the immediate operand by performing a sign extension on the immediate operand prior to storing the immediate operand in the storage unit.

3. The processor of claim 1, wherein the decode logic is further configured to modify the immediate operand by performing a zero extension on the immediate operand prior to storing the immediate operand in the storage unit.

4. The processor of claim 1, wherein the decode logic is further configured to modify the immediate operand by shifting the immediate operand left by two bits.

5. The processor of claim 1, wherein the decode logic is further configured to modify the immediate operand prior to storing the immediate operand in the storage unit.

6. The processor of claim 1, wherein a size of the immediate operand is indicated by bits in the second field.

7. The processor of claim 1, wherein a size of the immediate operand is selected from a group consisting of one byte, two bytes and four bytes.

8. The processor of claim 1, wherein the decode logic is further configured to obtain, modify, and store the immediate operand before the micro-sequence is executed.

9. An electronic device, comprising:
   a first processor; and
   a second processor coupled to the first processor, wherein the second processor is configured to directly execute a stack-based instruction set comprising bytecodes and a complementary instruction set comprising micro-sequence instructions, and wherein the second processor comprises;
      an instruction cache configured to store bytecodes and micro-sequence instructions;
      a register dedicated for storage of an immediate operand of a bytecode;
      decode logic coupled to the instruction cache and the register; and
      a micro-sequence vector table coupled to the decode logic, wherein the micro-sequence vector table comprises one entry for each bytecode of the stack-based instruction set, and wherein each entry comprises a plurality of fields unique to a bytecode corresponding to the entry, wherein the plurality of fields comprises:
         a first field configured to indicate whether the corresponding bytecode is to be executed directly or a micro-sequence is to be executed rather than the corresponding bytecode;
         a second field configured to indicate whether the corresponding bytecode requires an immediate operand stored in the instruction cache;
         a third field configured to indicate whether the decode logic is to modify the immediate operand; and
         a fourth field configured to store a reference to the micro-sequence,
      wherein the decode logic is configured to:
         obtain a bytecode from the instruction cache, wherein the bytecode requires an immediate operand stored in the instruction cache,
         use the bytecode to locate the entry in the micro-sequence vector table corresponding to the bytecode,
         cause the second processor to directly execute the single bytecode using the immediate operand when the first field of the entry indicates that the single bytecode is to be executed,
         obtain the immediate operand for the bytecode from the instruction cache when the first field of the entry indicates that a micro-sequence is to be executed and the second field of the entry indicates that the bytecode requires the immediate operand,
         modify the immediate operand when the third field indicates the immediate operand is to be modified, and
         store the modified operand in the register for use by a micro-sequence referenced in the fourth field of the entry.

10. The electronic device of claim 9, wherein the third field is further configured to indicate that the decode logic is to perform a sign extension on the immediate operand.

11. The electronic device of claim 9, wherein the third field is further configured to indicate that the decode logic is to perform a zero extension on the immediate operand.

12. The electronic device of claim 9, wherein the third field is further configured to indicate that the decode logic is to shift the immediate operand.

13. The electronic device of claim 12, wherein the third field is further configured to indicate that the decode logic is to shift the immediate operand left by two bits.

14. The electronic device of claim 9, wherein the second field is further configured to indicate a size of the immediate operand.

15. The electronic device of claim 9, wherein the electronic device is selected from the group consisting of a battery-operated device and a wireless communication device.

16. A method, comprising:
   fetching a single bytecode from an instruction cache, wherein the single bytecode requires an immediate operand stored in the instruction cache;
   using the single bytecode to locate an entry corresponding to the single bytecode in a micro-sequence vector table, wherein the micro-sequence vector table comprises one entry for each bytecode in an instruction set of a processor, wherein all fields in an entry are unique to a bytecode corresponding to the entry;
   causing the processor to directly execute the single bytecode using the immediate operand when a first field in the entry indicates that the single bytecode is to be executed; and
   when the first field in the entry indicates that a micro-sequence is to be executed instead of the single bytecode and a second field in the entry indicates that the immediate operand is required by the single bytecode, obtaining the immediate operand from the instruction cache;
   modifying the immediate operand when a third field in the entry indicates that the immediate operand is to be modified; and
   storing the modified immediate operand in a register for use by the micro-sequence.

17. The method of claim 16, wherein a size of the immediate operand is indicated by a configuration of the second field in the entry.

18. The method of claim 16, wherein modifying the immediate operand further comprises performing at least one of a sign extension, a zero extension or a shift operation on the immediate operand.

19. The method of claim 16, wherein storing the immediate operand further comprises storing the immediate operand before the micro-sequence is executed.

* * * * *